Oct. 31, 1961  W. J. WARREN ET AL  3,006,189
FLUID FLOW RECORDER
Filed June 25, 1956
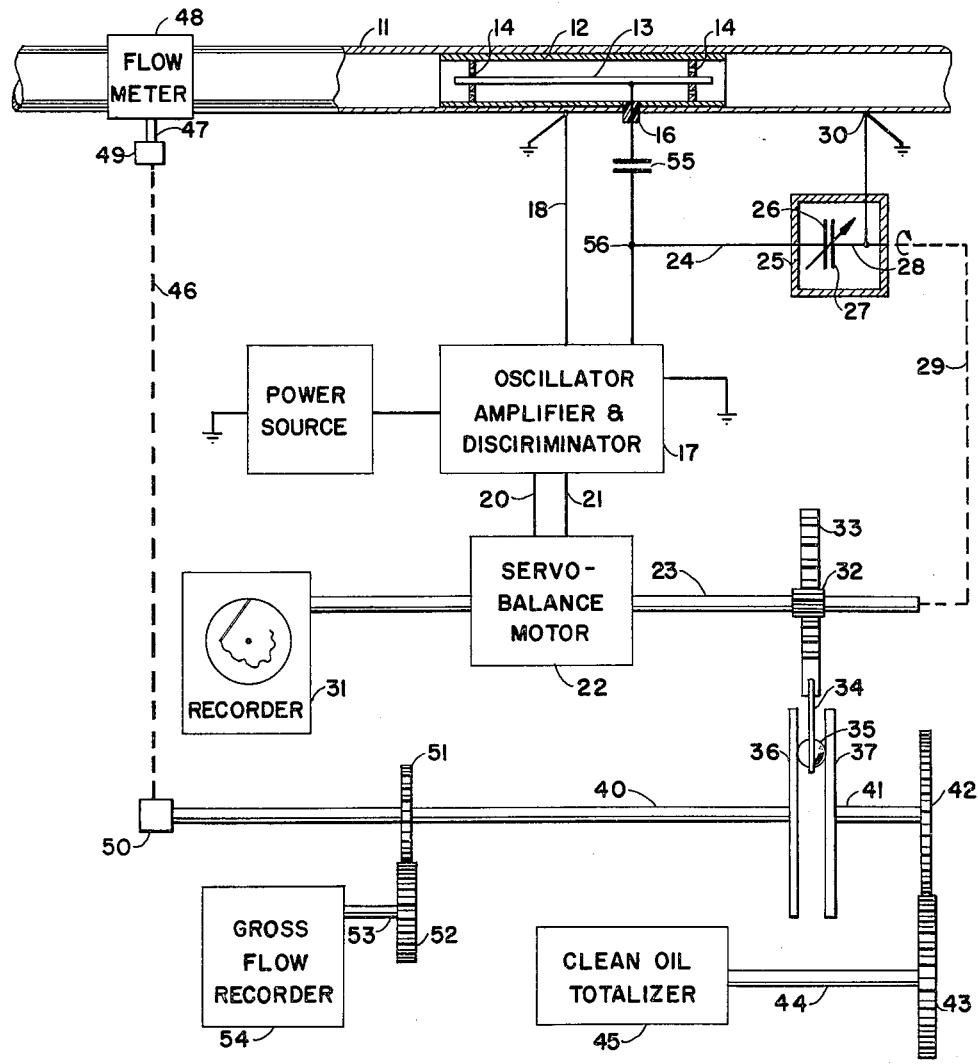
INVENTORS:
W.J. WARREN
R.L. WIXSON
F.C. SCHNEIDER
BY: J. H. McCarthy
THEIR AGENT

United States Patent Office 3,006,189
Patented Oct. 31, 1961

3,006,189
FLUID FLOW RECORDER
William J. Warren, El Cerrito, Roger L. Wixson, Oakland, and Fred C. Schneider, Berkeley, Calif., assignors to Shell Oil Company, New York, N.Y., a corporation of Delaware
Filed June 25, 1956, Ser. No. 593,403
3 Claims. (Cl. 73—194)

This invention relates to fluid flow meters and pertains more particularly to apparatus adapted to measure and record the flow of the major component of a two-phase fluid.

As an illustrative example, after one or more oil wells have been drilled on a lease of land, many problems are encountered in transferring the fluid produced by the wells from the wellheads to a pipe line for transportation to a refinery. In this transfer, there are several fundamental operations which include initially separating the production fluid into its component parts, and obtaining accurate determinations of the quantity and nature or quality of the products. Throughout the transfer operations, it is necessary to comply with many regulations set up by the government and of other regulatory bodies.

Initial separation of the production fluid into its component parts is actually accomplished on the producing lease, that is, at a location adjacent one or more of the producing wells. Production fluid from oil wells is generally composed of crude oil, gas, and BS and W (bottom sediment and water), which is a waste product and has no marketable value.

Gases are generally separated from the crude oil and BS and W at the producing location by a conventional separator which normally operates automatically and requires little manual attention. Some or substantially all of the water mixed with the crude oil may be separated from the oil at the same location. It is necessary to make some provision for removing the water component from the production fluid in order for the fluid to be accepted and transported by a common carrier such as a crude pipe line. Most pipe lines require that the BS and W component of the crude oil delivered to them be less than 1% in order to minimize formation of emulsions during the pumping of crude and to allow the pipe line to operate at its maximum capacity.

To assure that each well on a lease is producing the proper share of crude oil allowed by Government rules and regulations, and to obtain producing data for engineering studies of well performance, it is necessary that the amount of oil and water produced by each of the several wells be known. Since one or more of the wells may have been drilled on land owned by different individuals or corporations, it is also necessary to determine the amount of oil in the mixture of oil and water produced from each well in order to make the correct royalty payments to the various land owners.

It is therefore a primary object of the present invention to provide a flowmeter for measuring and recording the amount of oil in a two-phase production fluid which comprises a mixture of oil and water. The major component of BS and W is generally water, and reference hereafter to water shall also include the other contaminants which comprise the BS and W.

The sale or delivery of a tank of crude oil from a producing lease to a pipe line company involves the coordinated efforts of both production and pipe line company personnel. Before the discharge valve of a storage tank is opened to deliver a volume of crude oil to the pipe line, the tank must be gauged and the temperature, gravity and BS and W content of the crude oil must be measured. The BS and W content of the crude oil is normally determined by obtaining a sample of fluid from the tank and sending it to the laboratory for analyses. After the desired quantity of crude oil has been run from the tank, a second gauge of the tank must be taken. It is necessary for a representative of the production company and a representative of the pipe line company to be present at both of these times to witness and to agree as to measurements and other circumstances which are then recorded on the delivery ticket. In view of the number of tank batteries and the number of tanks to be checked each day in an oil field, considerable time is required to obtain the necessary data from the tanks of crude oil prior to the delivery of a pipe line. While care is taken to have substantially all of the water removed from oil to be delivered to a pipe line, as much as 1% of water may still be present in the oil, in the storage tanks, which amount must be accurately determined for future adjustment with the pipe line company.

It is therefore a further object of the present invention to provide an apparatus for measuring and recording the total amount preferably in gallons or barrels, of clean oil passing through the meter, while at the same time measuring the gross flow through a pipe line of a two-phase liquid such as oil and water.

These and other objects of this invention will be understood from the following description taken with reference to the attached drawing, wherein the major components of the present flowmeter recording apparatus are diagrammatically shown as connected to a pipe line for recording the flow therethrough.

Referring to the drawing, an oil field pipe line 11, through which a two-phase mixture or emulsion of oil and water is transported, is provided with a water-cut indicating device, preferably of the capacitance-cell type, which comprises two electrodes 12 and 13 positioned in spaced relationship within the bore of the pipe line 11. The electrode 12 may be a section of the pipe 11 or may take the form of a tubular metallic element about 2 feet long having an outer diameter substantially equal to the inner diameter of the pipe line 11, whereby it is in contact with and grounded to the pipe line 11. The other electrode 13 may take the form of a rod which is positioned axially within electrode 12 by means of nonconductive spiders or spacers 14. The center electrode 13 is electrically connected by means of lead 15, which passes through an insulated plug 16, to a combination oscillator-amplifier-discriminator unit 17, grounded to the pipe line through lead 18.

The oscillator-amplifier-discriminator unit 17 is connected through leads 20 and 21 to a servo-balance motor 22 mounted to rotate a shaft 23. The oscillator circuit of unit 17 is also connected through leads 15 and 24 to the fixed plate 26 of a balancing unit 25 whose movable plate 27 is rotated by a shaft 28 and is grounded at 30. The shaft 28 of the movable plate 27 is mechanically linked to shaft 23 as shown by the broken line 29.

One end of the shaft 23 of the servo-balance motor 22 is connected to a recorder 31. A pinion 32 is mounted on a shaft 23 of the motor 22, the teeth of the pinion meshing with the teeth of a rack bar 33. The rack bar 33 is slidably mounted for reciprocating movement between a pair of rotating discs 36 and 37. A cage 34 is secured to the end of the rack, and a ball 35 is rotatably positioned in the cage 34 in frictional contact between the adjacent faces of the rotating discs 36 and 37. The combination of ball 35 and discs 36 and 37 form a ball-and-disc type integrator. It is understood that two balls are normally used instead of the single ball 35. Other mechanical devices may be used which give the output shaft 41 a rotation rate or speed proportional to the input shaft rotation rate, multiplied by some desired function of displacement of another input element, such as rack 33.

The discs 36 and 37 are mounted for rotation on shafts 40 and 41. A gear 42 is mounted on shaft 41 to rotate therewith in meshing engagement with a gear 43 mounted on the shaft 44 of a recorder or totalizer 45. The shaft 40 is rotated through a mechanical linkage, represented by broken line 46, by the rotating shaft 47 of a flow meter 48 positioned in the pipe line 11. The flowmeter 48 is preferably of the positive-displacement type. Instead of using a mechanical linkage 46 to connect the shaft 47 of the flowmeter with shaft 40, a pair of Selsyns 49 and 50 may be mounted on shafts 47 and 40 and electrically interconnected. A gear 51 is mounted to rotate with shaft 40 in meshing engagement with gear 52 fixedly mounted on shaft 53 of a gross flow recorder 54 or totalizer, which may be of the rotating shaft type.

For certain applications of the present invention, for example, where high percentages of water are to be measured, a series capacitor 55 may be connected between terminal 56 and electrode 13. The electrical value of this capacitance 55 is predetermined in accordance with the dielectric properties of the crude oil and the design parameters of the capacity cell in the pipe line. By including the capacitor 55 it is possible to obtain a linear relationship between angular position of shaft 23 and the volume percentage of water in the crude oil stream in pipe line 11.

In the operation of the present apparatus, the mixture of oil and water flowing through the pipe 11 passes through the flowmeter 48 causing its shaft 47 to rotate. The rotation of shaft 47 is transmitted electrically or through mechanical linkage 46 to shaft 40 causing the shaft and the gears 51 and 52 to rotate and thus actuating the recorder 54, which records the total gross flow passing through the pipe line 11 in either gallons or barrels.

At the same time that the total flow in the pipe line 11 is being measured, the dielectric constant of the stream is measured as the fluid passes between electrodes 12 and 13 within the pipe line 11. The vacuum tube oscillator circuit of the unit 17 produces a high frequency alternating current. The signal of the oscillator 17 is impressed on the capacitor formed by the electrodes 12 and 13 in the pipe 11 and on the balancing capacitor 25, said two capacitors forming the total capacitance in a parallel resonant measuring circuit which, when combined with the amplifier of unit 17, senses and amplifies any change in capacitance of the capacity cell within the pipe 11 due to a change in the dielectric constant of the fluid passing through the pipe 11, and more particularly by a change in the percentage of water intermixed with the oil. A suitable amplifier oscillator is disclosed in a copending application of F. H. Branin, entitled "Phase Discriminating Circuit," filed September 27, 1954, Serial No. 458,337, now Patent No. 2,939,077, issued May 31, 1960.

The discriminator circuit of the unit 17 takes the amplified signal, senses the direction and magnitude of the change in cell capacitance, and transmits a corresponding electric signal to the servo-motor 22. The motor 22 turns shaft 23, repositioning the movable plate 27 of the balancing capacitor 25. At the same time, the rotating shaft drives the pen of the recorder 31 which records the amount of repositioning of the movable plate 27 required to rebalance the circuit and therefore the amount or percent of water in the oil flowing through the pipe line. Simultaneously, rotation of shaft 23 causes pinion 32 to move and change the position of rack 33 and ball 35 of the integrator to correspond to the change in the capacitance of the cell in the pipe line, as compared to a pre-determined reference value.

While the flow of fluid in the pipe line 11 is being recorded by the meter 54 through the actuation of shaft 40, the shaft 40 also rotates plate 36 of the integrator. Plate 37 is driven through frictional contact with ball 35 by plate 36 at a rate proportional to the percent of oil in the total flow of fluid passing through the pipe line 11. The rate of rotation of plate 37 is thus proportional to the product of the gross fluid flow rate in pipe 11 times the percent volume of clean oil in the pipe line stream. When there is no water in the oil, the ball 35 is at its extreme position near the periphery of the discs 36 and 37. The ball moves toward the center of the plates 36 and 37 as the percent of water in the flowing stream increases. The signal obtained from the output shaft 41 of the integrator is transmitted through gears 42 and 43, and through shaft 44 to the totalizer 45 where the cumulative total of clean oil passing through the pipe line 11 is recorded.

We claim as our invention:

1. An apparatus for determining the amount of water contained in an oil and water mixture comprising: a measuring capacitance cell, the dielectric of said measuring capacitance cell being formed by the oil and water mixture; a linearizing capacitor of predetermined size disposed in series with said measuring capacitance cell; a balancing capacitor cell coupled in parallel with said measuring capacitance cell and linearizing capacitor to form a measuring network; means for impressing an alternating signal across said network; means for varying the capacitance of said balancing capacitor cell to maintain a zero phase angle in said measuring network; and indicating means for indicating the capacitance of said balancing capacitor cell.

2. An apparatus for automatically and continuously determining the cumulative amount of clean oil in a flowing stream of oil and water passing through a pipe line within an interval of time, said apparatus comprising a flowmeter positioned in a pipe line, a rotating output shaft extending from said flowmeter, a ball-and-disc type integrator having an input and output shaft, first linkage means connecting said input shaft of said integrator with the shaft of said flowmeter, water-indicating capacitor cell means positioned in said pipe line for detecting and indicating the amount of water in fluid flowing through said pipe line, a linearizing capacitor of predetermined fixed size disposed in series with said water-indicating capacitor cell, a balancing-capacitor cell coupled in parallel with the series combination of said indicating capacitor cell and said linearizing capacitor to form a parallel capacitive circuit, an oscillator amplifier discriminator coupled to the capacitive circuit to form a parallel resonant measuring and resonance unbalance detecting circuit, positioning means for changing the position of the ball of said integrator in response to the unbalance of the resonant circuit, reversible motor means electrically connected to the output of said oscillator discriminator amplifier for driving said positioning means, second linkage means connecting the shaft of said reversible motor with said balancing-capacitor cell to adjust the value of said balancing capacitor cell to rebalance the resonant circuit, and recorder means coupled to the output shaft of said integrator for recording the cumulative flow of clean oil in the fluid passing through the pipe line over an interval of time.

3. An apparatus for automatically and continuously determining the cumulative amount of clean oil in a flowing stream of oil and water passing through a pipe line within a pre-determined interval of time, said apparatus comprising a flowmeter positioned in a pipe line, a rotating output shaft extending from said flowmeter, a ball-and-disc type integrator having an input and output shaft, first linkage means connecting said input shaft of said integrator with the shaft of said flowmeter, water-indicating capacitor cell means positioned in said pipe line for detecting and indicating the amount of water in fluid flowing through said pipe line, a balancing-capacitor cell connected in parallel with regard to the ground with said water-indicating capacitor cell, a measuring circuit comprising an oscillator-amplifier-discriminator unit electrically connected to said capacitor cells for maintaining the combined capacity of said cells constant, gear means for changing the position of the ball of said integrator in response to changes in the water content of the fluid in said pipe line, reversible motor means electrically connected to the output of said oscillator-amplifier-discriminator unit for driving said gear means, second linkage means connecting the shaft of said reversible motor with said balancing-capacitor cell, first recorder means mechanically connected to the output shaft of said integrator for recording the cumulative flow of clean oil in the fluid passing through the pipe line over a pre-determined interval of time, second recorded means coupled to the motor means for recording the amount of water in said flowing stream, and third recorder means coupled to said flowmeter for recording the cumulative flow therethrough.

References Cited in the file of this patent

UNITED STATES PATENTS

| | | |
|---|---|---|
| 2,435,043 | Lehde et al. | Jan. 27, 1948 |
| 2,535,027 | Anderson | Dec. 26, 1950 |
| 2,598,681 | Garbarini et al. | June 3, 1952 |
| 2,607,828 | Razek | Aug. 19, 1952 |
| 2,617,299 | Ennis et al. | Nov. 11, 1952 |
| 2,866,336 | Hitchcox | Dec. 30, 1958 |
| 2,906,948 | Shawhan | Sept. 29, 1959 |